(12) United States Patent
Hasegawa et al.

(10) Patent No.: US 8,712,244 B2
(45) Date of Patent: Apr. 29, 2014

(54) COMMUNICATION SYSTEM AND TIME SYNCHRONIZATION METHOD

(75) Inventors: Makoto Hasegawa, Samukawa (JP); Kazuyori Umematsu, Yokohama (JP); Tohru Kazawa, Kokubunji (JP); Atsushi Otani, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 13/210,165

(22) Filed: Aug. 15, 2011

(65) Prior Publication Data
US 2012/0057865 A1 Mar. 8, 2012

(30) Foreign Application Priority Data
Sep. 6, 2010 (JP) ................................. 2010-198798

(51) Int. Cl.
*H04J 14/08* (2006.01)
*H04B 10/00* (2013.01)
(52) U.S. Cl.
USPC .............................. 398/102; 398/99; 398/154
(58) Field of Classification Search
CPC ....... H04J 14/08; H04J 3/0652; H04J 3/0655; H04J 3/0667
USPC .................. 398/66, 67, 98, 99, 100, 102, 154
See application file for complete search history.

(56) References Cited

U.S. PATENT DOCUMENTS

| | | | |
|---|---|---|---|
| 2009/0067850 A1* | 3/2009 | Mizutani et al. | 398/154 |
| 2011/0129218 A1* | 6/2011 | Kim | 398/45 |
| 2011/0262133 A1* | 10/2011 | Yuan | 398/43 |
| 2012/0008953 A1* | 1/2012 | Lu et al. | 398/66 |
| 2013/0004160 A1* | 1/2013 | Chen et al. | 398/25 |

FOREIGN PATENT DOCUMENTS

| | | |
|---|---|---|
| JP | 2010278546 A | 12/2010 |
| WO | 2011058625 A1 | 5/2011 |

OTHER PUBLICATIONS

IEEE "IEEE Standard for a Precision Clock Synchronization Protocol for Networked Measurement and Control Systems" Jul. 24, 2008 (pp. i-269).
IEEE 802.3—2005 Section 64—"Multipoint MAC Control" 2005 (pp. 243-297).

\* cited by examiner

*Primary Examiner* — Daniel Dobson
(74) *Attorney, Agent, or Firm* — Volpe and Koenig, P.C.

(57) ABSTRACT

In a communication system using a PON, time synchronization of a slave device such as a base station is realized with respect to a master device such as an L2SW or the base station. Time information acquired by a GPS satellite is corrected by ranging information of a discovery function of an OLT so as to be reflected on time information of each ONU. A propagation delay from the L2SW to the OLT is obtained with the use of a delay estimation mechanism, a propagation delay from the OLT to the ONU which is obtained by ranging is added to obtain a propagation delay from the L2SW to the ONU. The obtained propagation delay from the L2SW to the ONU is added to the transmitted time stamp value whereby a time stamp value received at a base station or femtocell side becomes a time into which the propagation delay to the ONU is incorporated, and absolute values of clock timers can be synchronized with each other. The addition process can be realized by rewriting the time stamp value of the packet within the OLT or the ONU.

14 Claims, 15 Drawing Sheets

EMBODIMENT 1

TIME SYNCHRONIZATION FLOWCHART OF ONU 6 IN EMBODIMENT 2-2

COMMUNICATION SYSTEM AND TIME SYNCHRONIZATION METHOD

CLAIM OF PRIORITY

The present application claims priority from Japanese patent application JP 2010-198798 filed on Sep. 6, 2010, the content of which is hereby incorporated by reference into this application.

BACKGROUND OF THE INVENTION

1. Technical Field

The present invention relates to a communication system and a time synchronization method, and more particularly to a communication system between devices using a passive optical network (PON), and a time synchronization method.

2. Background Art

As one of public line networks using optical fibers, there is GE-PON standardized by IEEE 802.3ah. With application of Gigabit Ethernet (Registered trademark) which is a technology used in a LAN up to now, the GE-PON enables service provision for two-way transmission of packets of Ethernet (registered trademark) from a station device to a user terminal at the maximum of 1 Gbps. The PON includes an optical line terminal (OLT) and plural optical network units (ONUs), and multiplexes a signal from a terminal (PC, etc.) connected to the ONUs with an optical signal optically (in time division), and transmits the signal to the OLT through the ONU, an optical fiber, an optical splitter, and an optical fiber for the OLT in the stated order. After conducting various signal processing, the OLT conducts communication between a terminal of one ONU, and a terminal of another ONU of the PON or a terminal of an NW. Since the respective ONUs are arbitrarily located, for example, within a range of 0 to 20 km in optical fiber length, transmission delays are different from each other at this rate, resulting in a possibility that the optical signals output from the respective ONUs collide and interfere with each other. Accordingly, as disclosed in Chapter 64 of IEEE 802.3, delays of the output signals from the respective ONUs are adjusted by the aid of a ranging technique as if the respective ONUs were located at the same distance. As a result, the optical signals from the respective ONUs do not interfere with each other on the optical fiber to the OLT.

On the other hand, a cellular phone has a handover function of switching a communication partner to a base station having the highest receiving sensitivity according to travel of a terminal. In an electric communication, for example, a call area of the cellular phone in an extremely small range of, for example, about a dozen m in radius, or a base station in the call area is called "femtocell". In the related-art base station, a place in which a radio field intensity is weak, and communication is difficult remains in the interior of buildings or an underground. However, when the femtocell is disposed in such a place, a deficit of the call area can be compensated.

In CDMA 2000 and LTE, for the purpose of improving the handover function or a communication quality, time synchronization between the base stations is required, for example, with precision lower than 1 µs. It is general that a GPS signal receiver is disposed in the base station, and the time synchronization is conducted by the receiver. However, it is assumed that the installation of the GPS signal receiver is difficult in the base station of an underground city. Also, it is conceivable that the installation of the GPS signal receiver is economically difficult in an extremely compact base station such as the femtocell. Accordingly, in a system in which the femtocell is installed at home through the above-described PON, there is a need to realize accurate time synchronization over the network.

Presently, as the most important system for time information provision over the network, there is time information distribution by IEEE 1588. The details of this system are disclosed in IEEE 1588, Tutorial. As a first stage, a packet having a time stamp therein is repetitively transmitted from a master side to a slave side to synchronize a clock timer period at the slave side with a clock timer period at the master side. In this stage, because a signal propagation delay between the master and the slave is unclear, even if the clock timer periods can be synchronized with each other, absolute values of the clocks cannot be synchronized with each other. Subsequently, in a second stage, a packet for measuring a round-trip propagation delay (round-trip time between the master and the slave) is transmitted from the slave side to the master side. Upon receiving the packet, the master side returns the packet to the slave side within a specified time. The slave side that has received the packet measures the round-trip propagation delay on the basis of a receive time and a transmit time of the packet, and regards half the above measured round-trip propagation delay as a propagation delay from the master side to the slave side assuming that the propagation delay from the slave side to the master side is substantially equal to the propagation delay from the master side to the slave side. Then, the above-mentioned time stamp value allocated at the master side and the obtained propagation delay from the master side to the slave side are used to synchronize the absolute values of the clock timers at the master side and the slave side with each other.

When the time distribution packet is transmitted through a switch or a router, the packet delay is swayed, and therefore it is desirable to apply this technique on a link-by-link basis. Also, it is possible to enhance the precision with some statistic by obtaining an average value after plural trials are conducted.

SUMMARY OF THE INVENTION

When the above related art is used in the network through the PON, there arises such a problem that a precision in the time synchronization cannot be sufficiently enhanced in the above general method. The reason will be described below. In the PON, a downstream signal from the station side to a subscriber side is transmitted to all of the ONUs connected to the OLT in a multicast mode. Accordingly, the propagation delay of the downstream signal stops at a sum of the transmission delay (for example, about hundreds of microseconds at a maximum) proportional to an optical fiber length and a processing delay (for example, normally about tens of nanoseconds if there is no traffic congestion) within the OLT and the ONU. On the other hand, an upstream signal from the subscriber side to the station side is transmitted in order by the respective ONUs connected to the OLT on the basis of a time division multiple access (TDMA) system. This order is conducted, for example, in a cycle of about several milliseconds under the control of the OLT, and the signal from the ONU is made to wait within the ONU for a time of a maximum control cycle. That is, the propagation delay of the upstream signal becomes a large value to which a propagation delay factor of the downstream signal (about tens of microseconds in the above example) as well as the control cycle of the TDMA, for example, several milliseconds is added. Under such a circumstance where there is a large difference between the propagation delay of the downstream signal and the propagation delay of the upstream signal, a correct propagation delay time cannot be estimated in a delay estimate mechanism of IEEE 1588 based on the above-described round-trip delay time measurement with the result that there is a possibility that correct time synchronization is avoided.

The present invention has been made in view of the above circumstances, and therefore an object of the present invention is to realize high-precision time synchronization of a slave device such as a base station or a terminal device with respect to a master device such as a station device, the base station or the terminal device.

As described in the item of the Related Art, the PON system has a mechanism called "ranging" that measures the propagation delay between the OLT and the ONU. The above problem is solved by correcting time information used in IEEE 1588 with the propagation delay time from the OLT to the ONU which is obtained by ranging.

First means for solving the above problem will be described in detail below.

The propagation delay from the master to the OLT is obtained with the use of a related-art delay estimation mechanism such as IEEE 1588, and the propagation delay from the OLT to the ONU, which is obtained by ranging, is added to obtain the propagation delay from the master to the ONU. The obtained propagation delay from the master to the ONU is added to the time stamp value transmitted in the first stage of the related-art IEEE 1588 whereby the time stamp value received at the slave side becomes a time into which the propagation delay to the ONU is incorporated. That is, the slave side enables synchronization of the absolute values of the clock timers with the use of only the first stage of the mechanism such as IEEE 1588 without using the second stage. This addition processing can be realized by rewriting the time stamp value of the packet of the IEEE 1588 specifications within the OLT or the ONU.

Because a connection cable length between the ONU and the slave is several meters at a maximum, and the propagation delay time from the ONU to the slave is about tens of nanoseconds, the connection capable length and the propagation delay time can be ignored. However, the propagation delay from the ONU to the slave is obtained by the aid of the delay estimation mechanism such as the IEEE 1588, and the propagation delay from the ONU to the slave is further added to the time stamp value within the ONU to enable higher-precision time synchronization to be conducted.

Also, second means for solving the above problem will be described in detail below.

The propagation delay from the master to the OLT is obtained by the aid of the related-art delay estimation mechanism such as the IEEE 1588, and the propagation delay from the OLT to the ONU, which has been obtained by ranging, is further added thereto to obtain the propagation delay from the master to the ONU. A value of this propagation delay is transferred to the ONU. Then, when the slave side transmits a delay measurement packet with the use of the related-art delay estimation mechanism in the second stage of IEEE 1588, the ONU that has monitored the delay measurement packet discards the delay measurement packet without transmission toward the master, and further generates a return delay measurement packet after an arrival time of the delay measurement packet and after twice as long as the obtained propagation delay time from the master to the ONU, and returns the return delay measurement packet toward the slave. Because the slave side synchronizes the clock timers with each other on the basis of the delay measurement packet, an influence of the delay caused by the TDMA is removed.

Further, third means for solving the above problem will be described in detail below.

A value of half the control cycle of the TDMA described above is subtracted from the time stamp value transmitted in the first stage of the related-art IEEE 1588 to synchronize the clock timers at the slave side with each other. Then, the propagation delay time from the master to the slave is obtained with the use of the related-art delay estimation mechanism in the second stage of IEEE 1588 to synchronize the clock timers at the slave side with each other. In this stage, the clock timer at the slave side conducts the time synchronization with the value into which the worst delay amount caused by the TDMA is incorporated. However, the real delay amount under the TDMA control depends on an ONU arrival time of the propagation delay measurement packet and a TDMA control cycle due to the OLT, and is different from the TDMA control cycle. Under the circumstances, in the delay estimation mechanism in the second stage of the IEEE 1588, the ONU measures a time since receiving the propagation delay measurement packet until transmitting the packet, and stores the time therein. After completion of the delay estimation mechanism in the second stage of IEEE 1588, the time stamp value is periodically transmitted in the first stage of IEEE 1588. Therefore, the ONU subtracts a value of twice as large as (control cycle of the TDMA (worst delay amount)—real delay amount) from the time stamp value (or subtracts a value of twice as large as (worst value of a retention time of the upstream signal within an ONU 6—wait time within the ONU 6 caused by the TDMA control of the real upstream signal)). When the slave side resynchronizes the timer values with each other on the basis of the time stamp value thus corrected and the corrected value made by the past propagation delay time measurement, time synchronization based on the real delay amount is completed.

According to the present invention, for example, in a communication system including a PON having an OLT, an optical fiber, an optical splitter, and plural ONUS, a master device that transmits time information, and a slave device that receives the time information, the OLT includes a portion that corrects the received time information with the use of a signal transfer delay amount between the OLT and the ONU, which is acquired by a ranging process, and a time information transmission unit that transmits the corrected time information.

The ONU has a function of correcting the received time information on the basis of the signal transfer delay amount that is managed by the OLT, and a time information transmission unit that transmits the corrected time information.

The time information may be a received signal from a GPS satellite.

The OLT can add, to the time information, the signal transfer delay amount between the master device and the OLT and the signal transfer delay amount between the OLT and the ONU to correct the time information.

The OLT includes a unit that measures the signal transfer delay amount between the master device and the OLT, and the ONU includes a unit that receives the signal transfer delay amount between the master device and the OLT and the signal transfer delay amount between the OLT and the ONU, and upon receiving a delay time measurement signal from the slave device, returns the delay time measurement signal to the slave device after a time of twice as large as the signal transfer delay amount between the master device and the OLT and the signal transfer delay amount between the OLT and the ONU.

The ONU has a function of correcting the received time information, and the time information transmission unit that transmits the corrected time information, and also includes a function of storing a time since receiving the delay time measurement signal from the slave device until transmitting the delay time measurement signal toward the OLT therein, and corrects the received time information with the use of a time since receiving the delay time measurement signal from the slave device until transmitting the delay time measurement signal toward the OLT.

Also, according to the present invention, for example, in a communication system including a PON having an OLT, an optical fiber, an optical splitter, and plural ONUs, a master device that transmits time information, and a slave device that receives the time information, the OLT includes a time information termination unit that terminates the time information that is a received signal from a GPS satellite; a time synchronization unit that conducts time synchronization of an OLT time according to the received time information; a time synchronization packet generation unit that generates a time synchronization packet according to the synchronized OLT time; and a time information transmission unit that transmits the generated time synchronization packet, and the ONU includes a time synchronization packet termination unit that receives the time synchronization packet from the OLT through a communication line, and terminates the time synchronization packet; a time synchronization unit that conducts time synchronization of an ONU time by the received time synchronization packet; a time synchronization packet generation unit that generates the time synchronization packet according to the synchronized ONU time; and a time information transmission unit that transmits the generated time synchronization packet.

Further, according to the present invention, for example, in a communication system including a PON having an OLT, an optical fiber, an optical splitter, and plural ONUs, a master device that transmits time information, and a slave device that receives the time information, the ONU accommodates a device having a GPS receiver that can receive the time information from a GPS satellite, and a time information transmission unit that transits the time information and the OLT has a function of returning the received time information within the OLT.

The OLT has a function of correcting the time information returned within the OLT according to information of the ONU, and a function of transmitting the corrected time information to the ONU, and the ONU has a function of receiving the time information returned within the OLT, and transmitted and a function of conducting time synchronization according to the time information returned within the OLT and received.

According to the first solving means of the present invention, there is provided a communication system and a time synchronization method in the communication system including: a passive optical network (PON) having an optical line terminal (OLT), an optical fiber, an optical splitter, and a plurality of optical network units (ONUs); a master device that is connected to the OLT and transmits standard time information;

and a slave device that serves under one of the ONUs, and receives the time information, the communication system comprising:

a first ranging process in which the OLT transmits a first delay measurement signal to an ONU, receives a first return signal responsive to the first delay measurement signal from the ONU, and determines a one-way propagation delay time between the OLT and the ONU according to a value of half of a difference between a transmit time of the first delay measurement signal and a receive time of the first return signal;

a first stage time synchronization process in which the master device transmits a time synchronization message having a clock timer value of the master device inserted as a time stamp value to the OLT, and the OLT receives the time synchronization message and sets a clock timer of the OLT to the time stamp value;

a second stage time synchronization process in which the OLT transmits a second delay time measurement signal to the master device, receives a second return signal responsive to the second delay measurement signal from the master device, and determines a one-way propagation delay time between the master device and the OLT according to a value of half of a difference between a transmit time of the second delay time measurement signal and a receive time of the second return signal, and the OLT updates a clock timer value of the OLT to a value obtained by adding the one-way propagation delay time between the master device and the OLT to the clock timer value of the OLT; and a third stage time synchronization process in which the master device transmits the time synchronization message having the clock timer value inserted as the time stamp value to the OLT, the OLT rewrites the time stamp value of the time synchronization message to a value obtained by adding, to the time stamp value, the one-way propagation delay time between the OLT and the ONU which is obtained by the first ranging process, and the one-way propagation delay time between the master device and the OLT which is obtained by the second stage time synchronization process, and transmits the time synchronization message having the rewritten time stamp value to the slave device, and the slave device sets a clock timer of the slave device to the time stamp value.

According to the second solving means of the present invention, there is provided a communication system and a time synchronization method in the communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first ranging process in which the OLT transmits a first delay measurement signal to an ONU, receives a first return signal responsive to the first delay measurement signal from the ONU, and determines a one-way propagation delay time between the OLT and the ONU according to a value of half of a difference between a transmit time of the first delay measurement signal and a receive time of the first return signal;

a first stage time synchronization process in which the master device transmits a time synchronization message having a clock timer value of the master device inserted as a time stamp value to the OLT, and the OLT receives the time synchronization message and sets a clock timer of the OLT to the time stamp value;

a second stage time synchronization process in which the OLT transmits a second delay time measurement signal to the master device, receives a second return signal responsive to the second delay measurement signal from the master device, and determines a one-way propagation delay time between the master device and the OLT according to a value of half of a difference between a transmit time of the second delay time measurement signal and a receive time of the second return signal, and the OLT updates a clock timer value of the OLT to a value obtained by adding the one-way propagation delay time between the master device and the OLT to the clock timer value of the OLT;

a transfer process in which the ONU receives from the OLT and stores a one-way propagation delay time between the OLT and the ONU which is measured by the first ranging process and a one-way propagation delay time between the master device and the OLT which is obtained by the second stage time synchronization process, and/or, in which the ONU receives from the OLT and stores a total one-way propagation delay time between the master device and the ONU which is a total of the one-way propagation delay time between the master device and the OLT and the one-way propagation delay time between the OLT and the ONU; and a fourth stage time synchronization process in which the slave device transmits a third delay measurement signal to the ONU, the ONU returns a third return signal to the slave device after a time of twice of the total one-way propagation delay time between the master device and the ONU, and the slave device determines a one-way propagation delay time between the master device and the slave device according to a difference between a transmit time of the third delay measurement signal and a receive time of the third return signal, and corrects a clock timer value of the slave device according to the one-way propagation delay time between the master device and the slave device.

According to the third solving means of the present invention, there is provided a communication system and a time synchronization method in the communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first stage synchronization process in which the master device transmits a first time synchronization message having a clock timer value inserted as a time stamp value to the OLT, and the OLT subtracts half of the worst value of a predetermined retention time within an ONU from the time stamp value in the first time synchronization message, rewrites the time stamp value, and transmits the rewritten time stamp value to the slave device;

a second stage synchronization process in which the slave device transmits a delay time measurement signal to the ONU, the ONU transmits the delay time measurement signal toward the master device after the delay time measurement signal is retained within the ONU for a given wait time, the master device returns a return signal having a clock timer value of the master device inserted into the time stamp to the slave device, the slave device determines a one-way propagation delay time between the master device and the slave device according to a value of half of a difference between a transmit time of the delay time measurement signal and a receive time of the return signal, and the slave device adds the one-way propagation delay time between the master device and the slave device to a clock timer value of the slave device to update the clock timer value; and a third stage synchronization process in which the master device transmits a second time synchronization message having the clock timer value inserted as the time stamp value to the ONU, the ONU corrects the time stamp value to a value obtained by subtracting a value of twice as large as "the worst value of the retention time—the wait time" from the time stamp value, and transmits the second time synchronization message including the corrected time stamp value to the slave device, and the slave device sets the clock timer value of the slave device to a value obtained by adding the corrected time stamp value and the one-way propagation delay time between the master device and the slave device which is obtained by the second stage synchronization process.

According to the fourth solving means of the present invention, there is provided a communication system and a time synchronization method in the communication system including: a passive optical network (PON) having an optical line terminal (OLT), an optical fiber, an optical splitter, and a plurality of optical network units (ONUs); a master device that serves under a first ONU among the plurality of ONUs, and transmits standard time information; and a slave device that serves under a second ONU among the plurality of ONUs, and receives the time information, the communication system comprising:

a first stage process in which the master device transmits a first time synchronization message having a clock timer value of the master device inserted as a time stamp value to the first ONU, and the first ONU transmits a first time synchronization message in which the time stamp value is rewritten to a value obtained by adding a given first retention time within the first ONU to the time stamp value in the first time synchronization message toward the slave device connected to the second ONU;

a second stage process in which the slave device transmits a delay time measurement signal, the second ONU transmits the delay time measurement signal after a given second retention time within the second ONU, the master device receives the delay time measurement signal, and returns a return signal having the clock timer value of the master device inserted as the time stamp value, the first ONU transmits the return signal after the first retention time, the slave device obtains a round-trip propagation delay time according to a difference between a transmit time of the delay time measurement signal and a receive time of the received return signal, and further subtracts the first retention time of the first ONU and the second retention time of the second ONU from the round-trip propagation delay time to determine an one-way propagation delay time between the master device and the slave device; and a third stage process in which the master device transmits a second time synchronization message having the clock timer value of the master device inserted as the time stamp value, and the first ONU receives the second time synchronization message, rewrites the time stamp value to a value obtained by adding the first retention time to the time stamp value in the second time synchronization message, and transmits the rewritten time stamp value, and the slave device sets a clock timer value of the slave device to a value obtained by adding the rewritten time stamp value and the one-way propagation delay time between the master device and the slave device which is obtained in the second stage process.

According to the present invention, there is no need to install a GPS signal receiver in the slave device such as a base station or a femtocell. In particular, according to the present invention, there is advantageous in that accurate time synchronization can be realized by combination of the master device or the slave device (femtocell base station) which has already started introduction of the time synchronization by mounting the IEEE 1588 function therein, with the PON device.

DETAILED DESCRIPTION OF THE PREFERRED EMBODIMENTS

Time synchronization with high precision is required in service such as cellular phones. Now, a description will be given of a method of realizing the time synchronization with high precision without provision of a GPS signal receiver for performing time synchronization in a base station or a femtocell, with reference to three embodiments.

1. Embodiment 1

Figure 1:
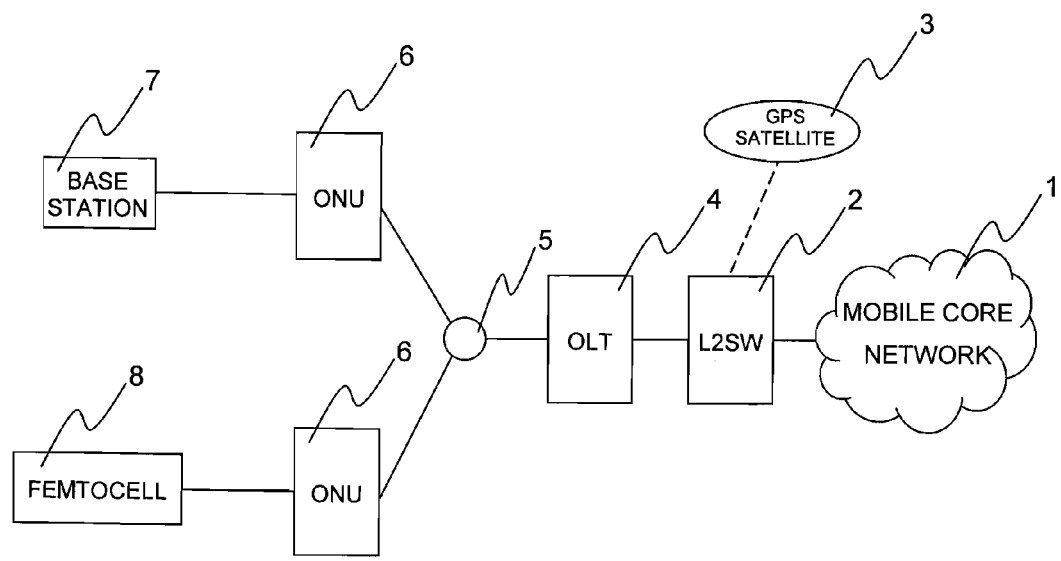
FIG. 1 illustrates a system configuration diagram of an embodiment 1 of the present invention.

FIG. 1 illustrates a system configuration diagram of an embodiment 1 of the present invention. The system includes a mobile core network 1 that is a communication network of cellular phones, and an L2SW 2 as an interface for communicating with the mobile core network 1, and the L2SW 2 has a function of receiving a GPS signal from a GPS satellite 3. The L2SW 2 accommodates an OLT 4, and the OLT 4 can accommodate plural ONUs 6 with the use of an optical splitter 5. Each of the ONUs 6 accommodates a base station 7 or a femtocell 8 therein. Now, a description will be given of a method of realizing time synchronization with provision of a time synchronization function in the OLT 4 at a master side and without provision of a GPS signal receiver by the base station 7 or the femtocell 8 at a slave side.

Figure 2:
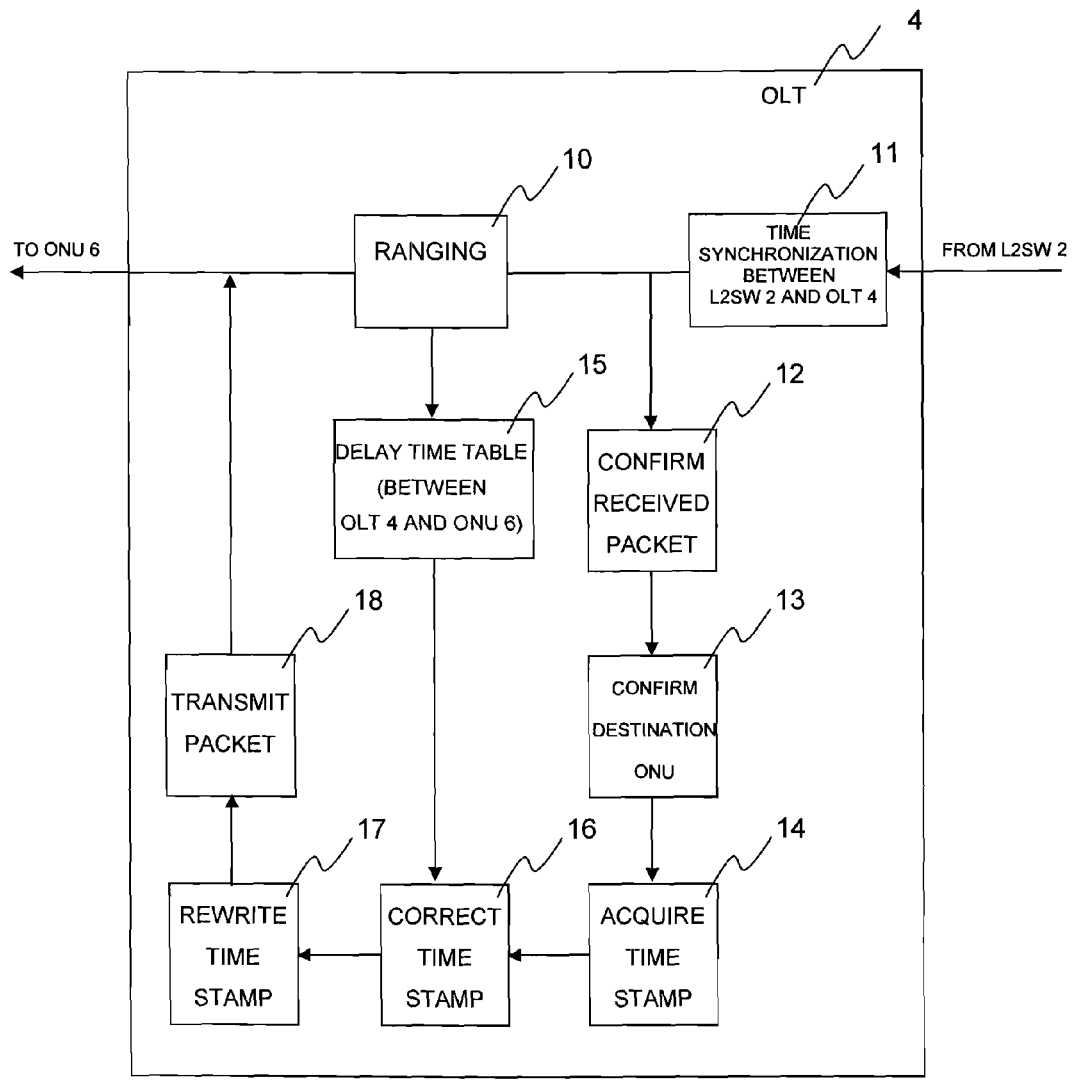
FIG. 2 illustrates a block diagram of an OLT in the embodiment 1 of the present invention.

FIG. 2 is a functional block diagram of the OLT 4 in the embodiment 1 of the present invention. The OLT 4 periodically conducts a distance measurement (ranging) between the OLT 4 and the ONUs 6 by a discovery function (10), and also conducts time synchronization processing between the L2SW 2 and the OLT 4 (11). The OLT 4 confirms a packet received from the L2SW 2 (12), and reads information on the destination ONU 6 from the packet received from the L2SW 2 if the received packet is a packet of IEEE 1588 having time information received from the GSP satellite (13). Then, the OLT 4 acquires a time stamp included in the packet of the IEEE 1588 having the time information received from the L2SW 2 (14). Then, the OLT 4 adds a delay time between the OLT 4 and the ONUs 6 with reference to a delay time table (15) having ranging information with respect to the destination ONU 6, thereby correcting the time stamp (16). Then, the OLT 4 rewrites the corrected time stamp to the time stamp included in the packet of IEEE 1588 having the received time information (17), and transmits the packet to the destination ONU 6 (18). The OLT 4 rewrites the time stamp to a corrected value whereby the base station 7 or the femtocell 8 can acquire high-precision time information and conduct time synchronization without provision of the GPS signal receiver.

Figure 3:
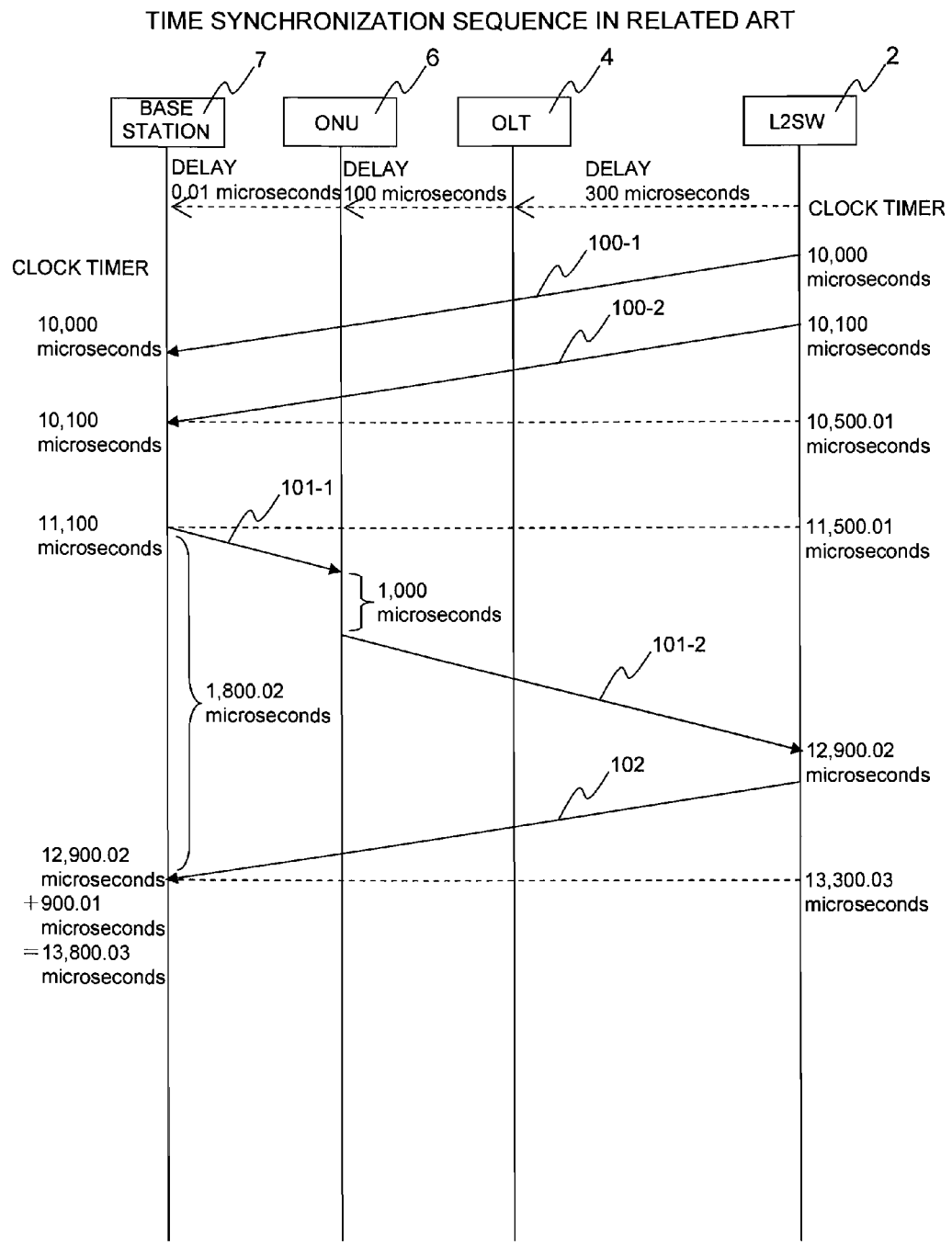
FIG. 3 illustrates a time synchronization sequence in a related art of the present invention.

FIG. 3 illustrates a time synchronization sequence in a related art of the present invention.

Prior to description of the sequence according to the embodiment 1 of the present invention, the sequence in the related art of the present invention will be described with reference to FIG. 3. In the following description, it is assumed that a propagation delay from the L2SW 2 that is a master to the OLT 4 is 300 microseconds, a propagation delay from the OLT 4 to the ONU 6 is 100 microseconds, and a propagation delay from the ONU 6 to the base station 7 is 0.01 microseconds. That is, a total of the propagation delays from the L2SW 2 to the base station 7 is 400.01 microseconds that is the total of the above delays.

As a first stage of processing specified by IEEE 1588, a packet 100 having a time stamp therein is repetitively transmitted from the L2SW 2 of the master to the base station 7 of a slave through the OLT 4 and the ONU 6. At a time when a clock timer value of the L2SW 2 is 10,000 microseconds, a packet 100-1 having the timer value as a time stamp value therein is transmitted. This packet is received by the base station 7 after a propagation delay (that is, after 400.01 microseconds) from the L2SW 2 to the base station 7, and the clock timer of the base station 7 is set to 10,000 microseconds. A value of the packet 100 subsequently received is monitored within the base station 7, and a cycle of the clock timer is continuously synchronized. In this stage, a signal propagation delay between the master and the slave is not reflected, and when the clock timer of the L2SW 2 is 10,500.01 microseconds, the clock timer of the base station 7 is 10,100 microseconds, and an absolute value of the time cannot be synchronized.

Subsequently, as a second stage, at a time when the clock timer value of the base station 7 is 11,100 microseconds, a packet 101-1 for measuring a round-trip propagation delay time is transmitted from the base station 7 to the L2SW 2. The packet 101-1 is retained within the ONU 6 for a wait time caused by a TDMA control of a PON upstream signal, and in this example, it is assumed that the wait time is set to 1,000 seconds in advance, and a packet 101-2 is transmitted toward the L2SW 2 after 1,000 seconds. At a time when the clock timer value of the L2SW 2 is 12,900.02 (=11,500.01+400.01+1,000) microseconds, the L2SW 2 receives the packet 101-2, and returns a return packet 102 toward the base station 7 within an ignorable small specified time (for example, in a time of 1 nanosecond or less which is a unit of a time system of IEEE 1588). At a time when the clock timer value of the base station 7 is 12,900.02 microseconds, the base station 7 receives the return packet 102, measures the round-trip propagation delay time according to a receive time of the return packet 102 and a transmit time (11,100 microseconds) of the packet 101-1, obtains a value of 1,800.02 microseconds, and determines that a one-way delay time is 900.01 microseconds which is a value of half the round-trip propagation delay time. The base station 7 adds the one-way delay time 900.01 microseconds to the clock timer value 12,900.02 microseconds of the base station 7, and updates the clock timer value to 13,800.03 microseconds. However, at this time, the clock timer of the L2SW 2 is 13,300.03, and those two timers are not synchronized in time with each other.

This is because the packet 101-1 is retained in the ONU 6 for 1,000 microseconds. For that reason, a downstream one-way propagation delay that is correctly 400.01 microseconds is incorrectly calculated as 900.01 microseconds.

Figure 4:
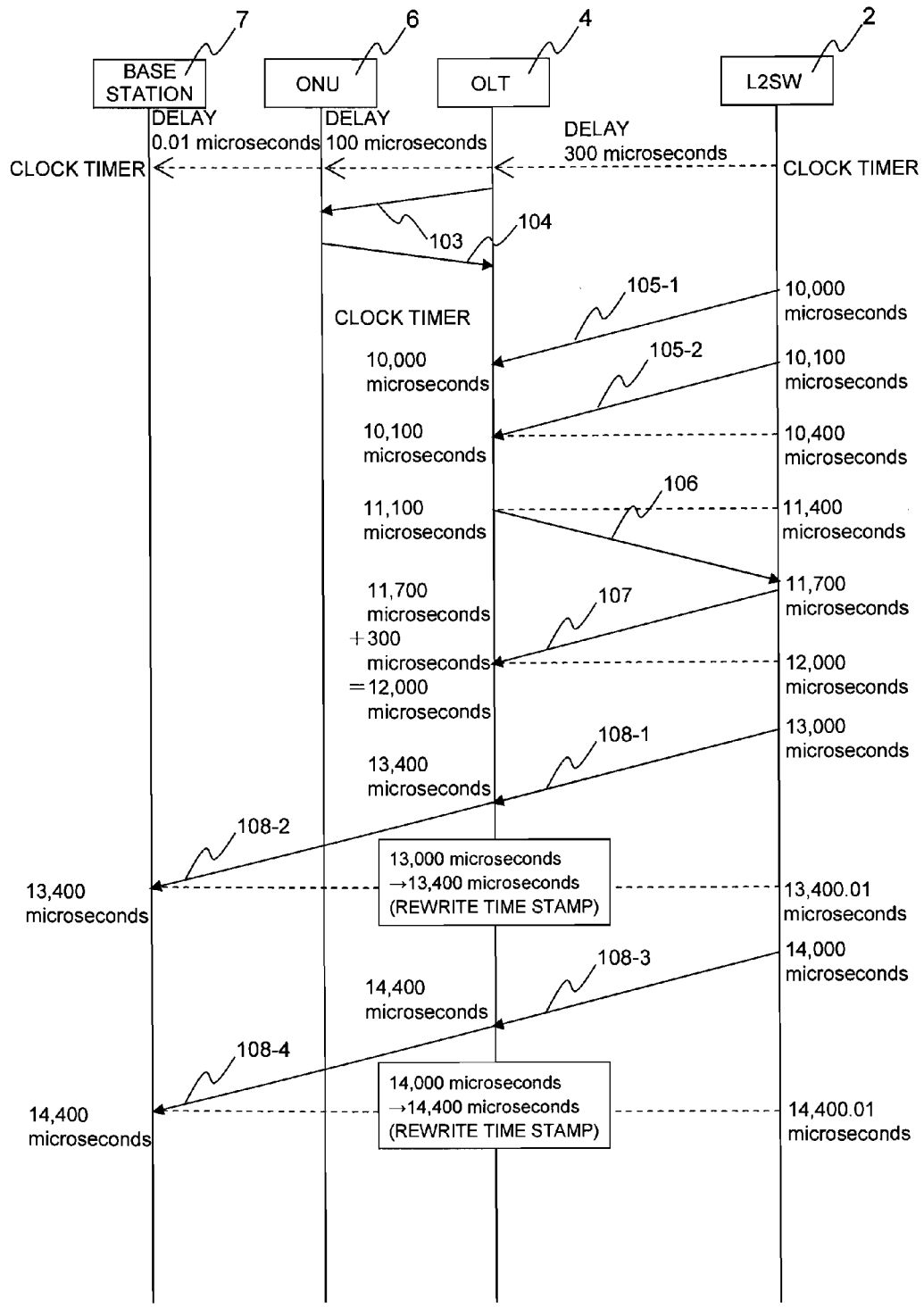
FIG. 4 illustrates a time synchronization sequence according to the embodiment 1 of the present invention.

FIG. 4 illustrates a time synchronization sequence according to the embodiment 1 of the present invention. The OLT 4 transmits a signal 103 to the ONU 6, measures the round-trip delay time between the OLT 4 and the ONU 6 according to the receive time of a signal 104 returned by the ONU 6, and obtains the one-way propagation delay time as a value of half of the round-trip delay time. The signal 104 of this process is returned immediately after being received by the ONU 6 as specified in IEEE 802.3 standards, chapter 64, to thereby obtain a correct one-way propagation delay time. As described above, the propagation delay time between the OLT 4 and the ONU 6 can be obtained by ranging, and in the respective embodiments of the present invention, a time of half the propagation delay time is used.

Subsequently, time synchronization between the L2SW 2 and the OLT 4 is conducted in the following procedure. As the first stage, at a time when the clock timer value of the L2SW 2 is, for example, 10,000 microseconds, a packet 105-1 having this value as the time stamp value therein is transmitted to the OLT 4. The packet 105-1 is received by the OLT 4 after the propagation delay (that is, after 300 microseconds) from the L2SW 2 to the OLT 4, and the clock timer of the OLT 4 is set to 10,000 microseconds. A value of a packet 105-2 subsequently received is monitored within the OLT 4, and a cycle of the clock timer is continuously synchronized. In this stage, the packets 105-1 and 105-2 which are transmitted from the L2SW 2 to the OLT 4 are transmitted in a multicast mode. Hereinafter, a signal for conducting the time synchronization is called "time synchronization message".

As a second stage, at a time when the clock timer value of the OLT 4 is, for example, 11,100 microseconds, a packet 106 for measuring the round-trip propagation delay time is transmitted from the OLT 4 to the L2SW 2. At a time when the clock timer value of the L2SW 2 is 11,700 microseconds, the L2SW 2 receives the packet 106, and returns a return packet 107 toward the OLT 4. At a time when the clock timer value of the OLT 4 is 11,700 seconds, the OLT 4 receives the packet 107, measures the round-trip propagation delay according to a receive time of the packet 107 and a transmit time (11,100 microseconds) of the packet 107, obtains a value of 600 microseconds, and determines that the one-way delay time is 300 microseconds which is a value of half the round-trip propagation delay time. The OLT 4 adds the one-way delay time 300 microseconds to the clock timer value 11,700 microseconds of the OLT 4, and updates the clock timer value to 12,000 microseconds. Thus, the clock timers of the L2SW 2 and the OLT 4 are synchronized with each other.

Subsequently, at a time when the clock timer value of the L2SW 2 is 13,000 microseconds, a clock synchronization message 108-1 having this value inserted as the time stamp value is transmitted to the OLT 4. In the OLT 4, the delay time 100 microseconds from the OLT 4 to the ONU 6, which has been measured by the ranging, and the delay time 300 microseconds from the L2SW 2 to the OLT 4, which has been obtained by the time synchronization, are added to the time stamp value 13,000 of the time synchronization message, and a time synchronization message 108-2 of the time stamp value rewritten to 13,400 microseconds is transmitted toward the base station 7. It is assumed that the rewrite of the time stamp value is executed on the respective ONUs 6, a rewrite time of the time stamp value is 1 ns or lower, and there is no influence of the rewrite time of the time stamp value. Subsequently, at a time when the clock timer value of the L2SW 2 is 14,000 microseconds, the same processing is also repeated, and at a time when the clock timer value of the L2SW 2 is 14,400.01 microseconds, the clock timer of the base station 7 is set to 14,400 microseconds, and the time synchronization is completed with an error of 0.01 microseconds.

Figure 5:
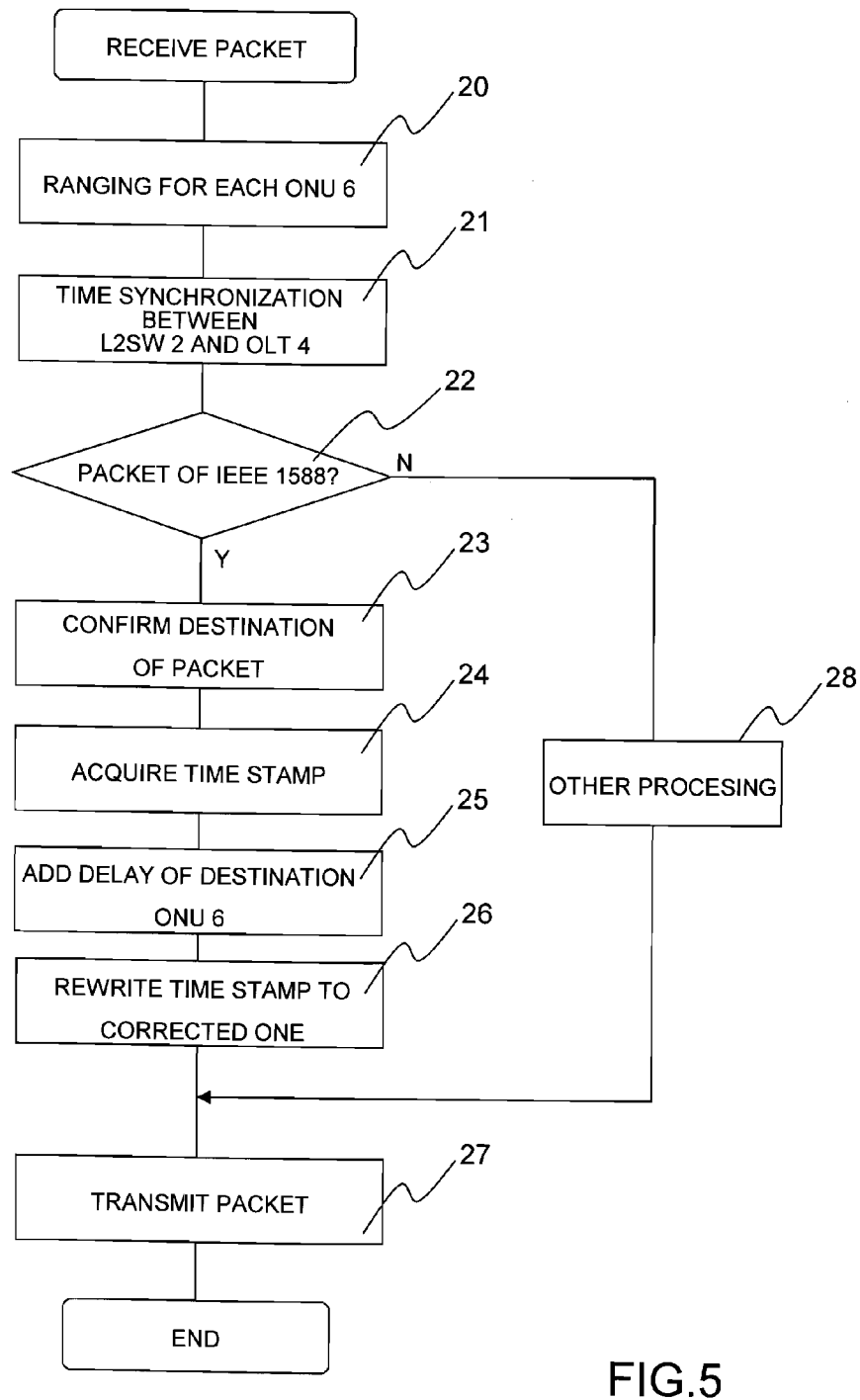
FIG. 5 illustrates a time synchronization flowchart of the OLT according to the embodiment 1 of the present invention.

FIG. 5 illustrates a time synchronization flowchart of the OLT 4 according to the embodiment 1 of the present invention. Upon receiving the packet from the L2SW 2, the OLT 4 conducts the ranging process for each of the ONUs 6 (20), and also calculates the one-way propagation delay time according to the round-trip propagation delay time between the L2SW 2 and the OLT 4 as described in the time synchronization processing between the L2SW 2 and the OLT 4 in FIG. 4, adds the one-way propagation delay time to the clock timer of the OLT 4, and conducts the time synchronization between the L2SW 2 and the OLT 4 (21). Subsequently, the OLT 4 confirms whether the received packet is the packet of IEEE 1588 having the time information, or not (22). If the received packet is the packet of IEEE 1588 having the time information, the OLT 4 confirms the destination ONU 6 of the received packet (23), acquires the time stamp value included in the received packet (24), adds a delay amount between the OLT 4 and the ONU 6 according to ranging information from the destination ONU 6 to correct the time stamp (25), rewrites the time stamp of the received packet to the corrected time stamp (26), and transmits the packet to the destination ONU 6 (27). Also, if the packet received from the L2SW 2 is not the packet of IEEE 1588 having the time information, after conducting the other processing (28), for example, since the OLT 4 determines an identifier of an LLID (logical link ID) for determining will or choice of a receive frame at the time of registering the ONU 6, the OLT 4 writes the LLID corresponding to the destination ONU 6 of the packet received by the OLT 4 in the received packet, and transmits the packet to the ONU 6 (27).

2. Embodiment 2

2-1. Embodiment 2-1

Subsequently, an embodiment 2 of the present invention will be described. The configuration of the device and the block diagram are identical with those in the embodiment 1. In this embodiment, a method of realizing the time synchronization with higher precision than that in the embodiment 1 will be described.

Figure 6:
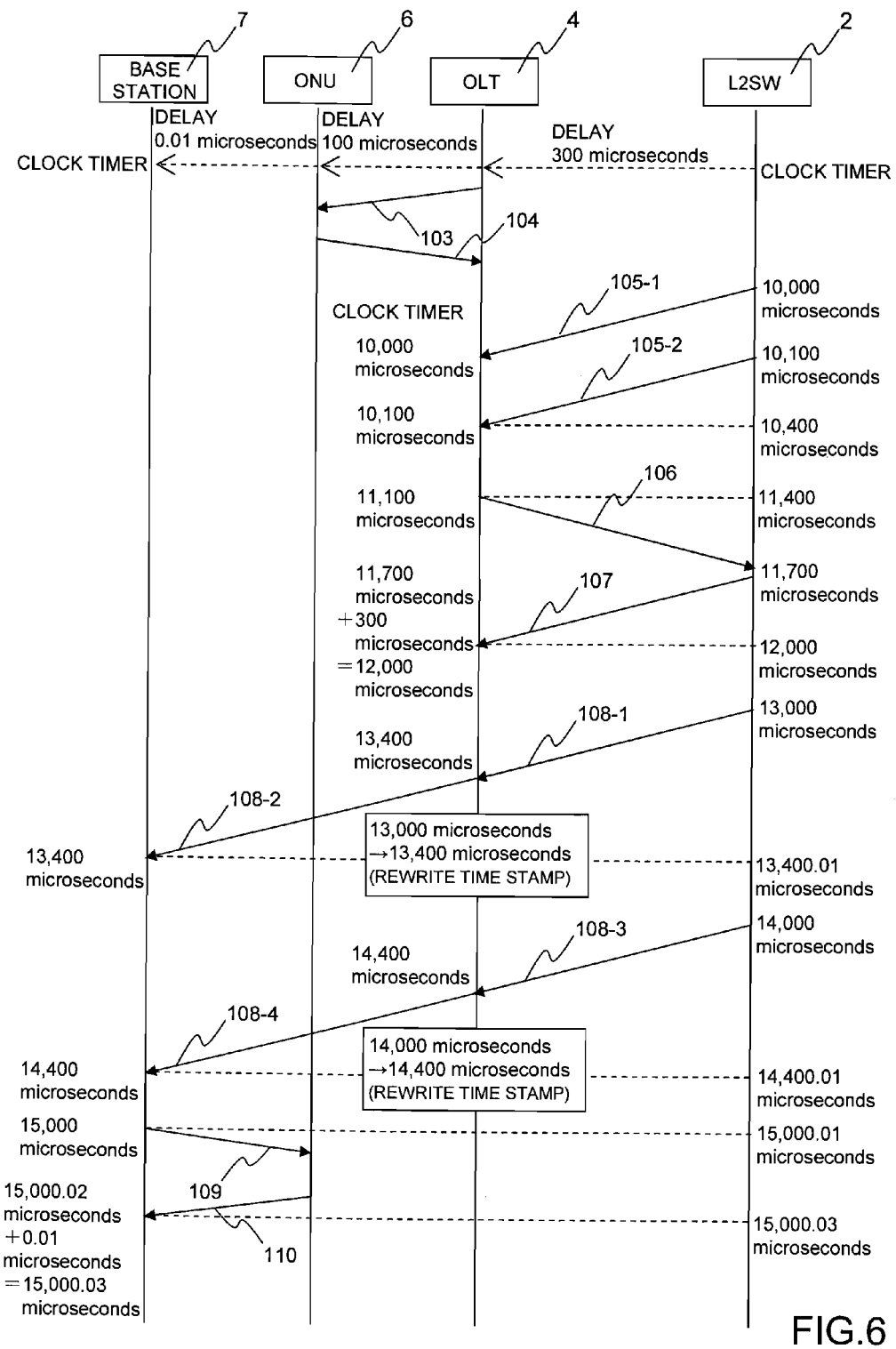
FIG. 6 illustrates a time synchronization sequence according to an embodiment 2-1 of the present invention.

FIG. 6 illustrates a time synchronization sequence according to the embodiment 2-1. In the embodiment 1, an error of 0.01 microseconds occurs in the clock timer values of the L2SW 2 and the base station 7. This is particularly because there is no function of correcting the propagation time between the ONU 6 and the base station 7. In a sequence diagram of the embodiment 2-1, the base station 7 transmits a delay measurement signal 109 toward the ONU 6, and the ONU 6 returns a delay measurement signal 110 to the base station 7, thereby measuring the round-trip propagation delay time between the base station 7 and the ONU 6 to obtain the one-way propagation delay time. The base station 7 adds the one-way propagation delay time to the clock timer value so as to correct the error of 0.01 microseconds. In this example, the base station 7 measures this error according to the transmit time 15,000 microseconds of the packet 109 and the receive time 15,000.02 microseconds of the packet 110.

2-2. Embodiment 2-2

Figure 7:
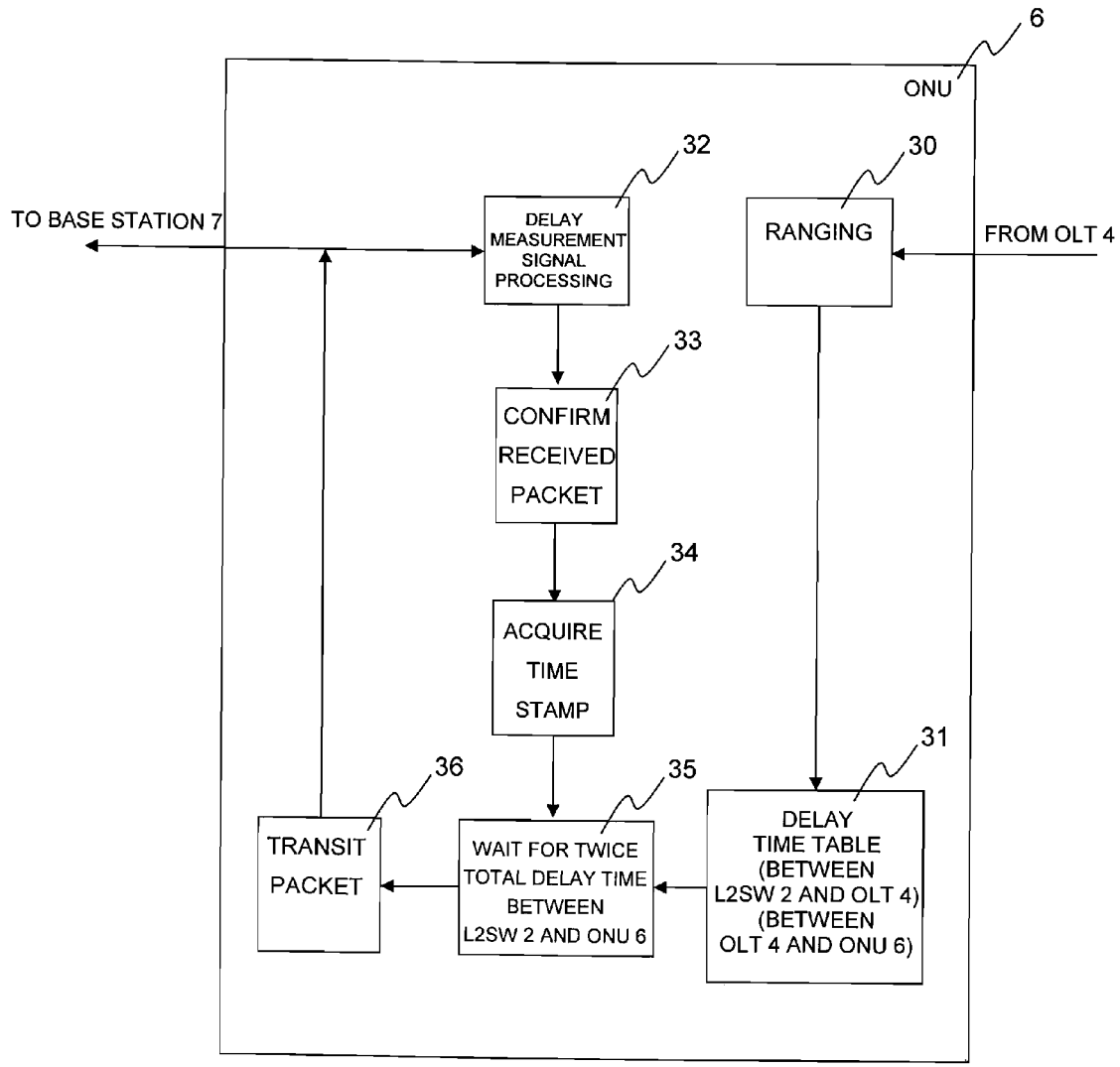
FIG. 7 illustrates a block diagram of an ONU according to an embodiment 2-2 of the present invention.

FIG. 7 illustrates a block diagram of the ONU 6 according to an embodiment 2-2. The ONU 6 receives, through ranging processing (30), information on the delay time between the OLT 4 and the ONU 6 and the delay time between the L2SW 2 and the OLT 4, which have been measured by the OLT 4, from the OLT 4, and stores the information in a delay time table (31). On the other hand, upon receiving the delay measurement signal from the base station 7 (32), the ONU 6 confirms a received packet (33), acquires the time stamp (34), refers to the delay time table (31), and returns the delay measurement signal to the base station 7 (36) after a time of twice the stored total delay time between the L2SW 2 and the ONU 6 (35). The base station 7 calculates a value of the propagation delay from the receive time of the delay measurement signal so as to conduct the time synchronization.

Figure 8:
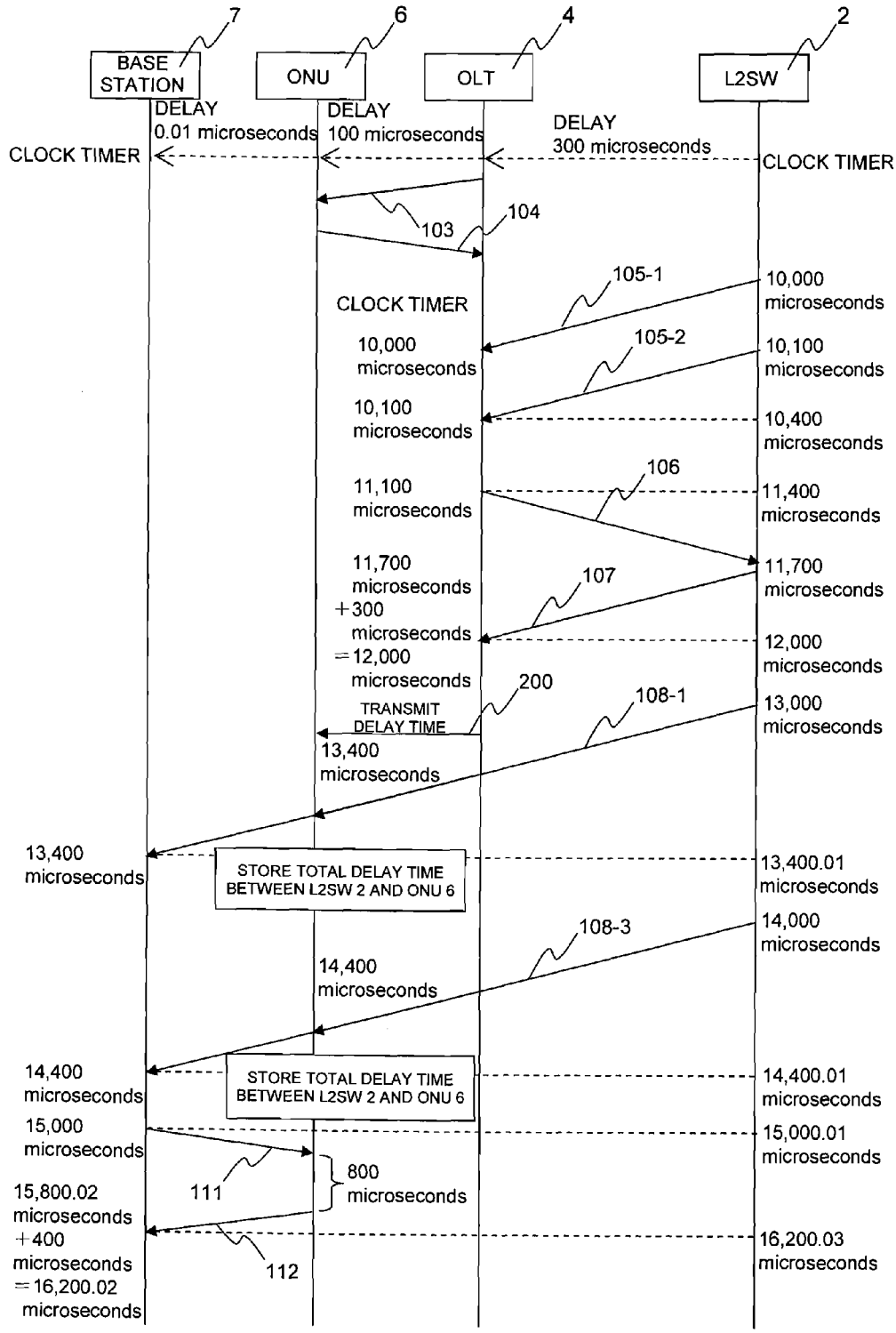
FIG. 8 illustrates a time synchronization sequence according to the embodiment 2-2 of the present invention.

FIG. 8 illustrates a time synchronization sequence according to the embodiment 2-2. In this example, in the sequence described in FIG. 4, the time synchronization between the L2SW 2 and the OLT 4 is conducted through transmission and reception of the packets 103 to 107. However, the OLT 4 does not rewrite the time stamp value of the time synchronization message which is transmitted from the L2SW 2 toward the base station 7. Instead, information of 400 microseconds in total, including the delay time 100 microseconds from the OLT 4 to the ONU 6 (packets 103, 104, etc.) which has been measured by ranging, and the delay time 300 microseconds from the L2SW 2 to the OLT 4 (packets 106, 107, etc.) which has been obtained in time synchronization, is transferred from the OLT 4 to the ONU 6 (200), and stored. The transferred or stored information may be each of the delay time 100 microseconds from the OLT 4 to the ONU 6 and the delay time 300 microseconds from the L2SW 2 to the OLT 4, may be only a total delay time obtained by totaling both of those delay times, or may be both of those delay times. The calculation of total may be conducted by any one of the OLT 4 and the ONU 6. On the other hand, the base station 7 transmits a delay measurement signal 111 toward the ONU 6, and the ONU 6 returns a delay measurement signal 112 to the base station 7 after 800 microseconds which is a value of twice the stored total delay time (400 microseconds) between the L2SW 2 and the ONU 6. The base station 7 calculates a value of the propagation delay of 400 microseconds on the basis of the receive time of the delay measurement signal 112 so as to correct the clock timer value.

Figure 9:
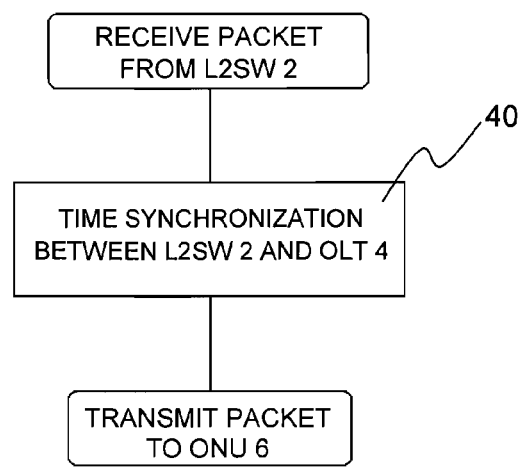
FIG. 9 illustrates a time synchronization flowchart of an OLT according to the embodiment 2-2 of the present invention.

FIG. 9 is a time synchronization flowchart according to the embodiment 2-2 of the present invention. Upon receiving the time synchronization message from the L2SW 2, the OLT 4 conducts time synchronization processing between the L2SW 2 and the OLT 4 (40), and transmits information on the delay time from the L2SW 2 to the OLT 4, which has been obtained by the time synchronization, and the delay time from the OLT 4 to the ONU 6 which has been measured by ranging from the OLT 4 to the ONU 6. In this situation, rewrite of the time stamp of the time synchronization message to be transmitted to the ONU 6 is not conducted.

Figure 10A:
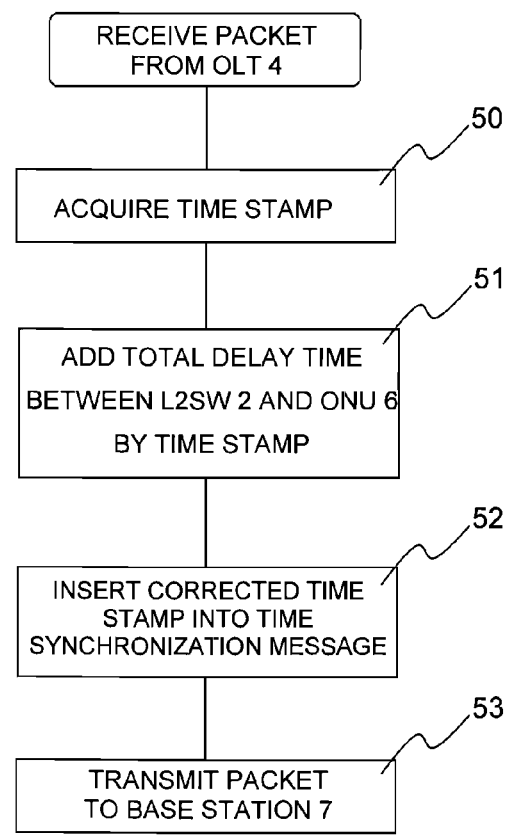
FIG. 10A illustrates a time synchronization flowchart (1) of the ONU according to the embodiment 2-2 of the present invention.
Figure 10B:
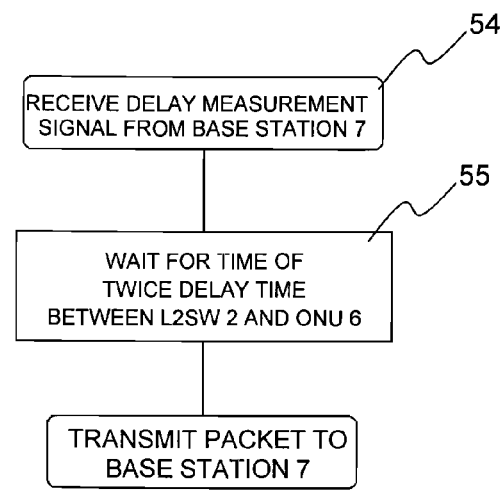
FIG. 10B illustrates a time synchronization flowchart (2) of the ONU according to the embodiment 2-2 of the present invention.

FIGS. 10A and 10B are time synchronization flowcharts of the ONU 6 according to the embodiment 2-2 of the present invention. As illustrated in FIG. 10A, upon receiving the time synchronization message from the OLT 4, the ONU 6 acquires the time stamp (50), and adds a value of the total delay time between the L2SW 2 and the ONU 6, which has been received from the OLT 4 and stored for correction according to the time stamp (51). The ONU 6 inserts the corrected time stamp into the received time synchronization message (52), and transmits the message to the base station 7 (53). Also, as illustrated in FIG. 10B, upon receiving the delay measurement signal from the base station 7 (54), the ONU 6 transmits the delay measurement signal to the base station 7 after a time of twice the stored delay time between the L2SW 2 and the ONU 6 (55).

2-3. Embodiment 2-3

Figure 11:
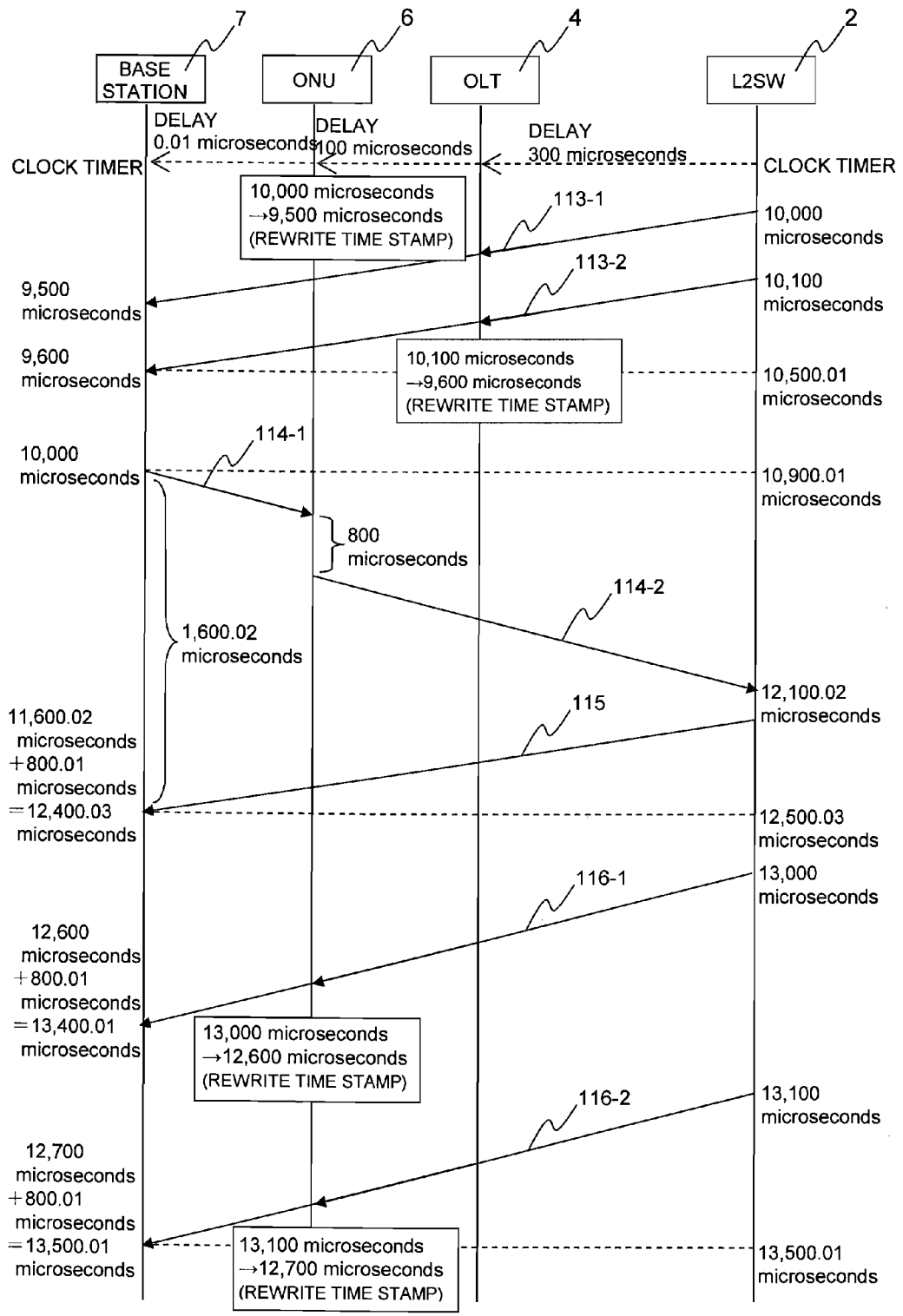
FIG. 11 illustrates a time synchronization sequence according to an embodiment 2-3 of the present invention.

FIG. 11 is a time synchronization sequence according to an embodiment 2-3 of the present invention. As a first stage, at a time when the clock timer value of the L2SW 2 is 10,000 microseconds, a packet 113-1 having this value inserted as the time stamp value thereinto is transmitted to the OLT 4. The packet 113-1 is received by the OLT 4 after the propagation delay (that is, after 300 microseconds) from the L2SW 2 to the OLT 4. The OLT 4 subtracts half the worst value (for example, 1000 microseconds) of a retention time of the upstream signal within the ONU 6, in this example, a value of 500 microseconds from the time stamp value in the packet 113-1, rewrites the value to 9,500 microseconds, and transmits the packet toward the base station 7. In this stage, the clock timer of the base station 7 is synchronized in time with a value into which the worst delay amount is incorporated. The worst value of the retention time is appropriately determined according to measured values, empirical values, or statistical values.

Subsequently, as a second stage, at a time when the clock timer value of the base station 7 is 10,000 microseconds, a packet 114-1 for measuring the round-trip propagation delay time is transmitted from the base station 7 to the L2SW 2. The packet 114-1 is retained within the ONU 6 for a wait time of the PON upstream signal caused by the TDMA control, and in this example, the packet 114-2 is transmitted toward the L2SW 2 after 800 microseconds. In this situation, the ONU 6 stores a value of the wait time 800 microseconds therein in advance. This wait time is appropriately determined according to measured values, empirical values, or statistical values in advance. At a time when the clock timer value of the L2SW 2 is 12,100.02 (=10,900.01+0.01+800+100+300) microseconds, the L2SW 2 receives the packet 114-2, and returns a return packet 115 having the clock timer value inserted into the time stamp toward the base station 7. The base station 7 receives the return packet 115 at a time when the clock timer value of the base station 7 is 11,600.02 microseconds, measures the round-trip propagation delay time according to the receive time of the return packet 115 and the transmit time 10,000 microseconds of the packet 114-1, obtains a value of 1,600.02 microseconds, and determines that the one-way propagation delay time is 800.01 microseconds which is half the round-trip propagation delay time. The base station 7 adds the one-way propagation delay time 800.01 microseconds to the clock timer value 11,600.02 microseconds of the base station 7, and updates the clock timer value to 12,400.03 microseconds. At this time point, the clock timer value of the L2SW 2 does not yet match the clock timer value of the base station 7.

Subsequently, as a third stage, at a time when the clock timer value of the L2SW 2 is 13,000 microseconds, a packet 116-1 having this value inserted as the time stamp value thereinto is transmitted to the ONU 6. The ONU 6 subtracts, from the time stamp value 13,000 microseconds, a value of 400 microseconds, which is a value of twice (worst value 1,000 microseconds of the retention time of the upstream signal within the ONU 6—wait time 800 microseconds within the ONU 6 caused by the TDMA control of the real upstream signal), and transmits the packet toward the base station 7. Also, at a time when the clock timer value of the L2SW 2 is 13,100 microseconds, the same processing is repeated. The base station 7 adds the corrected time stamp value and a corrected value (one-way propagation delay time) 800.01 microseconds which has been calculated by the past propagation delay time measurement, and sets the clock timer value to conduct resynchronization, and the time synchronization based on the real delay amount is completed.

3. Embodiment 3

Subsequently, an embodiment 3 of the present invention will be described. The configuration of the device is identical with that of the embodiment 1, and a difference from the embodiment 1 resides in that the GPS signal receiver is provided in not the L2SW 2 but any one of the base station 7 and the femtocell 8. For example, a description will be given of a method of realizing the time synchronization in which a base station 7-1 is equipped with the GPS signal receiver, and another base station 7-2 is not equipped with the GPS signal receiver. The femtocell 8 may be equipped with the GPS signal receiver.

Figure 12:
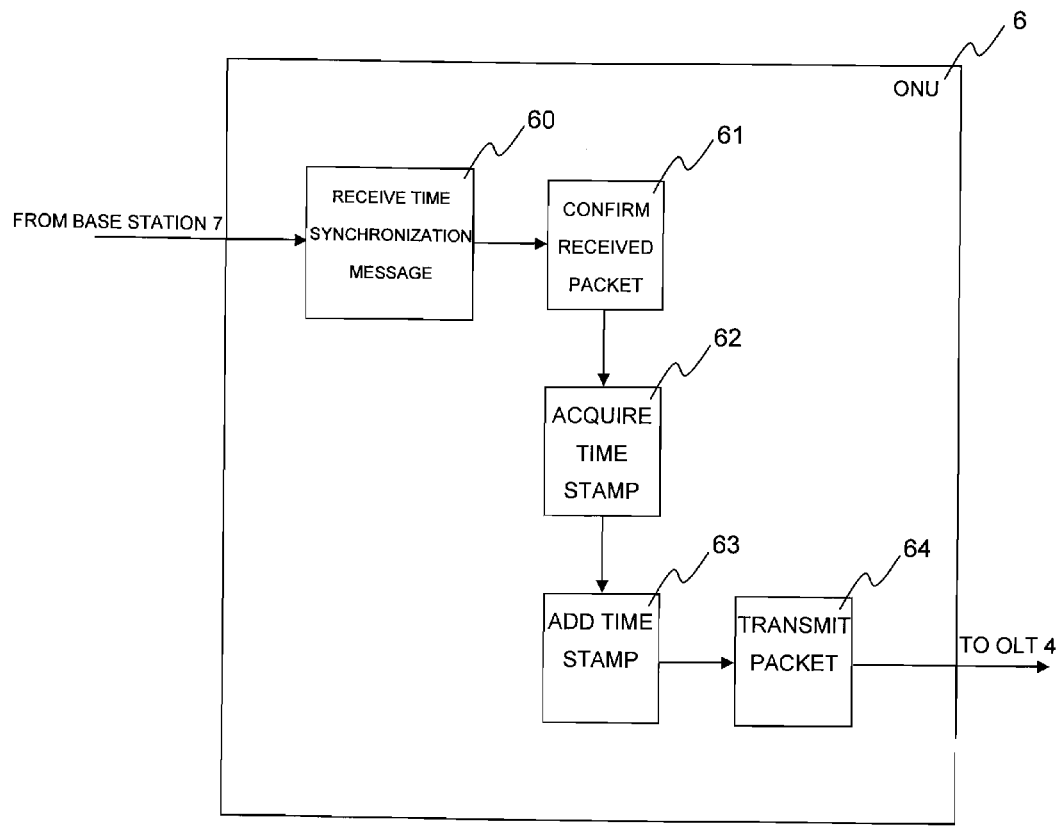
FIG. 12 illustrates a block diagram of an ONU according to an embodiment 3 of the present invention.

FIG. 12 is a block diagram of the ONU 6 according to the embodiment 3 of the present invention. Upon receiving a time synchronization message from the base station 7 (60), the ONU 6 confirms a received packet (61), acquires the time stamp (62), adds the retention time within the ONU 6 to the time stamp value (63), and transmits the packet to the OLT 4 (64).

Figure 13:
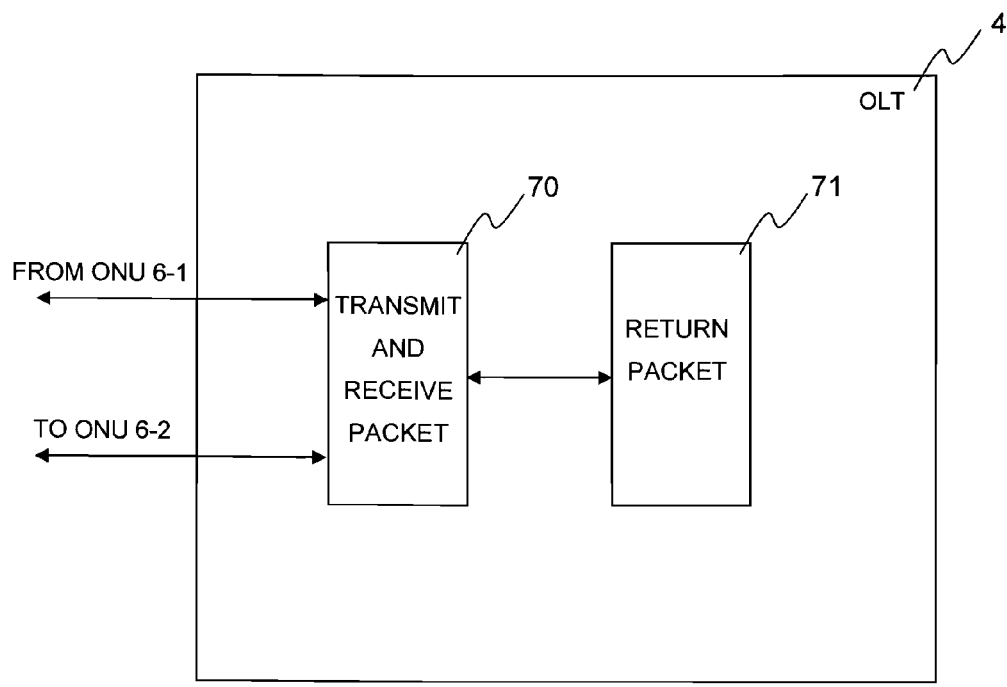
FIG. 13 illustrates a block diagram of an OLT according to the embodiment 3 of the present invention.

FIG. 13 is a block diagram of the OLT 4 according to the embodiment 3 of the present invention. Upon receiving the packet of the time synchronization message from an ONU 6-1 (70), the OLT 4 returns the packet within the OLT 4, and transmits the packet to an ONU 6-2.

Figure 14:
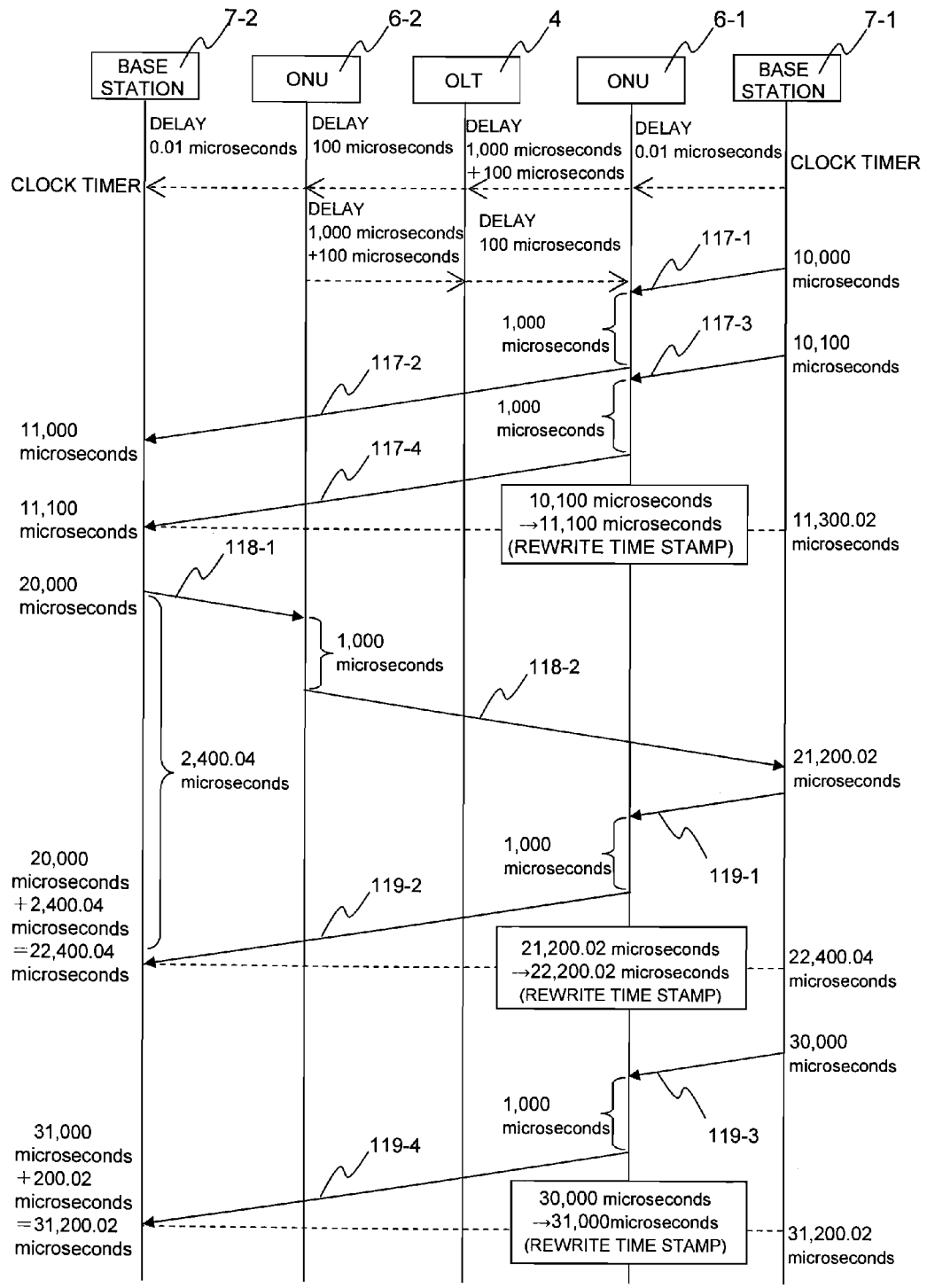
FIG. 14 illustrates a time synchronization sequence according to the embodiment 3 of the present invention.

FIG. 14 is a time synchronization sequence according to the embodiment 3 of the present invention. As a first stage, at a time when the clock timer value of the base station 7-1 is 10,000 microseconds, a packet 117-1 having this value inserted as the time stamp value thereinto is transmitted to the ONU 6-1. The packet 117-1 is received by the ONU 6-1 after the propagation delay (that is, after 0.01 microseconds) from the base station 7-1 to the ONU 6-1. The ONU 6-1 adds the retention time of the upstream signal within the ONU 6-1 caused by the TDMA control, for example, a value of 1,000 microseconds, to the time stamp value within the packet 117-1, rewrites the value to 11,000 microseconds, and transmits the packet toward the OLT 4. The OLT 4 that has receives the packet 117-1 returns the packet within the OLT 4, and transmits the packet toward the base station 7-2 connected to the respective ONUs 6 (in this example, ONU 6-2) under the OLT 4.

Subsequently, as a second stage, at a time when the clock timer value of the base station 7-2 is 20,000 microseconds, a packet 118-1 for measuring the round-trip propagation delay time is transmitted from the base station 7-2 to the base station 7-1. The packet 118-1 is retained within the ONU 6-2 for a wait time (retention time) of the upstream signal caused by the TDMA control, and in this example, a packet 118-2 is transmitted toward the base station 7-1 after 1,000 microseconds. At a time when the clock timer value of the base station 7-1 is 21,200.02 (=20,000+0.01+1000+100+100+0.01) microseconds, the base station 7-1 receives the packet 118-2, and returns a return packet 119-1 having the clock timer value inserted as the time stamp value toward the base station 7-2. The ONU 6-1 adds the retention time within the ONU 6-1 to the time stamp value of the packet 119-1, rewrites the time stamp value, and transmits the packet toward the base station 7-2. At a time when the clock timer value of the base station 7-2 is 22,400.04 (=21,200.02+0.01+1000+200+0.01) microseconds, the base station 7-2 receives a packet 119-2 added with the propagation delay time by the ONU 6-1, measures the round-trip propagation delay time from the receive time of the packet 119-2 and the transmit time of the packet 118-2 (20,000 microseconds), obtains a value of 2400.04 microseconds, subtracts wait times (retention times) (1000 microseconds×2) of both of the PON upstream signal and the PON downstream signal caused by the TDMA control from that value, and determines that the one-way propagation delay time is 200.02 microseconds which is half the round-trip propagation delay time.

Subsequently, as a third stage, at a time when the clock timer value of the base station 7-1 is 30,000 microseconds, a packet 119-3 having the clock timer value inserted as the time stamp value is transmitted to the base station 7-2. The ONU 6-1 adds a value of 1,000 microseconds, which is a value of the wait time of the upstream signal of the PON caused by the TDMA control, to the time stamp value 30,000 microseconds, rewrites the time stamp value, and transmits the packet value toward the base station 7-2. The base station 7-2 sets the clock timer value to a value obtained by addition of the corrected time stamp value and the corrected value 200.02 microseconds caused by the past propagation delay time measurement. As a result, the clock timer values are synchronized with each other to complete the time synchronization.

The above description has been given of the embodiment in which the master device is L2SW, and the slave device is the base station, and the embodiment in which the master device is the base station, and the slave device is another base station. However, the present invention is not limited to the above embodiments, but the master device and the slave device can be applied to a device such as an appropriate communication device.

The example in which the standard time information is received by the GPS satellite has been described. However, the present invention is not limited to this configuration, but time information from an appropriate reference time generator can be used.

What is claimed is:

1. A communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first ranging process in which the OLT transmits a first delay measurement signal to an ONU, receives a first return signal responsive to the first delay measurement signal from the ONU, and determines a one-way propagation delay time between the OLT and the ONU according to a value of half of a difference between a transmit time of the first delay measurement signal and a receive time of the first return signal;

a first stage time synchronization process in which the master device transmits a time synchronization message having a clock timer value of the master device inserted as a time stamp value to the OLT, and the OLT receives the time synchronization message and sets a clock timer of the OLT to the time stamp value;

a second stage time synchronization process in which the OLT transmits a second delay time measurement signal to the master device, receives a second return signal responsive to the second delay measurement signal from the master device, and determines a one-way propagation delay time between the master device and the OLT according to a value of half of a difference between a transmit time of the second delay time measurement signal and a receive time of the second return signal, and the OLT updates a clock timer value of the OLT to a value obtained by adding the one-way propagation delay time between the master device and the OLT to the clock timer value of the OLT; and a third stage time synchronization process in which the master device transmits the time synchronization message having the clock timer value inserted as the time stamp value to the OLT, the OLT rewrites the time stamp value of the time synchronization message to a value obtained by adding, to the time stamp value, the one-way propagation delay time between the OLT and the ONU which is obtained by the first ranging process, and the one-way propagation delay time between the master device and the OLT which is obtained by the second stage time synchronization process, and transmits the time synchronization message having the rewritten time stamp value to the slave device, and the slave device sets a clock timer of the slave device to the time stamp value.

2. The communication system according to claim 1, wherein the slave device further transmits a third delay time measurement signal to the ONU, receives a third return signal responsive to the third delay measurement signal from the ONU, determines a one-way propagation delay time between the slave device and the ONU according to a value of half of a difference between a transmit time of the third delay time measurement signal and a receive time of the third return signal, and corrects the clock timer value to a value obtained by further adding the one-way propagation delay time between the slave device and the ONU to the clock timer value of the slave device.

3. A communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first ranging process in which the OLT transmits a first delay measurement signal to an ONU, receives a first return signal responsive to the first delay measurement signal from the ONU, and determines a one-way propagation delay time between the OLT and the ONU according to a value of half of a difference between a transmit time of the first delay measurement signal and a receive time of the first return signal;

a first stage time synchronization process in which the master device transmits a time synchronization message having a clock timer value of the master device inserted as a time stamp value to the OLT, and the OLT receives the time synchronization message and sets a clock timer of the OLT to the time stamp value;

a second stage time synchronization process in which the OLT transmits a second delay time measurement signal to the master device, receives a second return signal responsive to the second delay measurement signal from the master device, and determines a one-way propagation delay time between the master device and the OLT according to a value of half of a difference between a transmit time of the second delay time measurement signal and a receive time of the second return signal, and the OLT updates a clock timer value of the OLT to a value obtained by adding the one-way propagation delay time between the master device and the OLT to the clock timer value of the OLT;

a transfer process in which the ONU receives from the OLT and stores a one-way propagation delay time between the OLT and the ONU which is measured by the first ranging process and a one-way propagation delay time between the master device and the OLT which is obtained by the second stage time synchronization process, and/or, in which the ONU receives from the OLT and stores a total one-way propagation delay time between the master device and the ONU which is a total of the one-way propagation delay time between the master device and the OLT and the one-way propagation delay time between the OLT and the ONU; and a fourth stage time synchronization process in which the slave device transmits a third delay measurement signal to the ONU, the ONU returns a third return signal to the slave device after a time of twice of the total one-way propagation delay time between the master device and the ONU, and the slave device determines a one-way propagation delay time between the master device and the slave device according to a difference between a transmit time of the third delay measurement signal and a receive time of the third return signal, and corrects a clock timer value of the slave device according to the one-way propagation delay time between the master device and the slave device.

4. A communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first stage synchronization process in which the master device transmits a first time synchronization message having a clock timer value inserted as a time stamp value to the OLT, and the OLT subtracts half of the worst value of a predetermined retention time within an ONU from the time stamp value in the first time synchronization message, rewrites the time stamp value, and transmits the rewritten time stamp value to the slave device;

a second stage synchronization process in which the slave device transmits a delay time measurement signal to the ONU, the ONU transmits the delay time measurement signal toward the master device after the delay time measurement signal is retained within the ONU for a given wait time, the master device returns a return signal having a clock timer value of the master device inserted into the time stamp to the slave device, the slave device determines a one-way propagation delay time between the master device and the slave device according to a value of half of a difference between a transmit time of the delay time measurement signal and a receive time of the return signal, and the slave device adds the one-way propagation delay time between the master device and the slave device to a clock timer value of the slave device to update the clock timer value; and a third stage synchronization process in which the master device transmits a second time synchronization message having the clock timer value inserted as the time stamp value to the ONU, the ONU corrects the time stamp value to a value obtained by subtracting a value of twice as large as "the worst value of the retention time—the wait time" from the time stamp value, and transmits the second time synchronization message including the corrected time stamp value to the slave device, and the slave device sets the clock timer value of the slave device to a value obtained by adding the corrected time stamp value and the one-way propagation delay time between the master device and the slave device which is obtained by the second stage synchronization process.

5. A communication system including: a passive optical network (PON) having an optical line terminal (OLT), an optical fiber, an optical splitter, and a plurality of optical network units (ONUs); a master device that serves under a first ONU among the plurality of ONUs, and transmits standard time information; and a slave device that serves under a second ONU among the plurality of ONUs, and receives the time information, the communication system comprising:

a first stage process in which the master device transmits a first time synchronization message having a clock timer value of the master device inserted as a time stamp value to the first ONU, and the first ONU transmits a first time synchronization message in which the time stamp value is rewritten to a value obtained by adding a given first retention time within the first ONU to the time stamp value in the first time synchronization message toward the slave device connected to the second ONU;

a second stage process in which the slave device transmits a delay time measurement signal, the second ONU transmits the delay time measurement signal after a given second retention time within the second ONU, the master device receives the delay time measurement signal, and returns a return signal having the clock timer value of the master device inserted as the time stamp value, the first ONU transmits the return signal after the first retention time, the slave device obtains a round-trip propagation delay time according to a difference between a transmit time of the delay time measurement signal and a receive time of the received return signal, and further subtracts the first retention time of the first ONU and the second retention time of the second ONU from the round-trip propagation delay time to determine an one-way propagation delay time between the master device and the slave device; and a third stage process in which the master device transmits a second time synchronization message having the clock timer value of the master device inserted as the time stamp value, and the first ONU receives the second time synchronization message, rewrites the time stamp value to a value obtained by adding the first retention time to the time stamp value in the second time synchronization message, and transmits the rewritten time stamp value, and the slave device sets a clock timer value of the slave device to a value obtained by adding the rewritten time stamp value and the one-way propagation delay time between the master device and the slave device which is obtained in the second stage process.

6. A time synchronization method in a communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first ranging process in which the OLT transmits a first delay measurement signal to an ONU, receives a first return signal responsive to the first delay measurement signal from the ONU, and determines a one-way propagation delay time between the OLT and the ONU according to a value of half of a difference between a transmit time of the first delay measurement signal and a receive time of the first return signal;

a first stage time synchronization process in which the master device transmits a time synchronization message having a clock timer value of the master device inserted as a time stamp value to the OLT, and the OLT receives the time synchronization message and sets a clock timer of the OLT to the time stamp value;

a second stage time synchronization process in which the OLT transmits a second delay time measurement signal to the master device, receives a second return signal responsive to the second delay measurement signal from the master device, and determines a one-way propagation delay time between the master device and the OLT according to a value of half of a difference between a transmit time of the second delay time measurement signal and a receive time of the second return signal, and the OLT updates a clock timer value of the OLT to a value obtained by adding the one-way propagation delay time between the master device and the OLT to the clock timer value of the OLT; and a third stage time synchronization process in which the master device transmits the time synchronization message having the clock timer value inserted as the time stamp value to the OLT, the OLT rewrites the time stamp value of the time synchronization message to a value obtained by adding, to the time stamp value, the one-way propagation delay time between the OLT and the ONU which is obtained by the first ranging process, and the one-way propagation delay time between the master device and the OLT which is obtained by the second stage time synchronization process, and transmits the time synchronization message having the rewritten time stamp value to the slave device, and the slave device sets a clock timer of the slave device to the time stamp value.

7. The time synchronization method according to claim 6, wherein the slave device further transmits a third delay time measurement signal to the ONU, receives a third return signal responsive to the third delay measurement signal from the ONU, determines a one-way propagation delay time between the slave device and the ONU according to a value of half of a difference between a transmit time of the third delay time measurement signal and a receive time of the third return signal, and corrects the clock timer value to a value obtained by further adding the one-way propagation delay time between the slave device and the ONU to the clock timer value of the slave device.

8. A time synchronization method in a communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first ranging process in which the OLT transmits a first delay measurement signal to an ONU, receives a first return signal responsive to the first delay measurement signal from the ONU, and determines a one-way propagation delay time between the OLT and the ONU according to a value of half of a difference between a transmit time of the first delay measurement signal and a receive time of the first return signal;

a first stage time synchronization process in which the master device transmits a time synchronization message having a clock timer value of the master device inserted as a time stamp value to the OLT, and the OLT receives the time synchronization message and sets a clock timer of the OLT to the time stamp value;

a second stage time synchronization process in which the OLT transmits a second delay time measurement signal to the master device, receives a second return signal responsive to the second delay measurement signal from the master device, and determines a one-way propagation delay time between the master device and the OLT according to a value of half of a difference between a transmit time of the second delay time measurement signal and a receive time of the second return signal, and the OLT updates a clock timer value of the OLT to a value obtained by adding the one-way propagation delay time between the master device and the OLT to the clock timer value of the OLT;

a transfer process in which the ONU receives from the OLT and stores a one-way propagation delay time between the OLT and the ONU which is measured by the first ranging process and a one-way propagation delay time between the master device and the OLT which is obtained by the second stage time synchronization process, and/or, in which the ONU receives from the OLT and stores a total one-way propagation delay time between the master device and the ONU which is a total of the one-way propagation delay time between the master device and the OLT and the one-way propagation delay time between the OLT and the ONU; and a fourth stage time synchronization process in which the slave device transmits a third delay measurement signal to the ONU, the ONU returns a third return signal to the slave device after a time of twice of the total one-way propagation delay time between the master device and the ONU, and the slave device determines a one-way propagation delay time between the master, device and the slave device according to a difference between a transmit time of the third delay measurement signal and a receive time of the third return signal, and corrects a clock timer value of the slave device according to the one-way propagation delay time between the master device and the slave device.

9. A time synchronization method in a communication system including: a passive optical network (PON) having an optical line terminal (OLT), an optical fiber, an optical splitter, and a plurality of optical network units (ONUs); a master device that is connected to the OLT and transmits standard time information; and a slave device that serves under one of the ONUs, and receives the time information, the communication system comprising:

a first stage synchronization process in which the master device transmits a first time synchronization message having a clock timer value inserted as a time stamp value to the OLT, and the OLT subtracts half of the worst value of a predetermined retention time within an ONU from the time stamp value in the first time synchronization message, rewrites the time stamp value, and transmits the rewritten time stamp value to the slave device;

a second stage synchronization process in which the slave device transmits a delay time measurement signal to the ONU, the ONU transmits the delay time measurement signal toward the master device after the delay time measurement signal is retained within the ONU for a given wait time, the master device returns a return signal having a clock timer value of the master device inserted into the time stamp to the slave device, the slave device determines a one-way propagation delay time between the master device and the slave device according to a value of half of a difference between a transmit time of the delay time measurement signal and a receive time of the return signal, and the slave device adds the one-way propagation delay time between the master device and the slave device to a clock timer value of the slave device to update the clock timer value; and a third stage synchronization process in which the master device transmits a second time synchronization message having the clock timer value inserted as the time stamp value to the ONU, the ONU corrects the time stamp value to a value obtained by subtracting a value of twice as large as "the worst value of the retention time—the wait time" from the time stamp value, and transmits the second time synchronization message including the corrected time stamp value to the slave device, and the slave device sets the clock timer value of the slave device to a value obtained by adding the corrected time stamp value and the one-way propagation delay time between the master device and the slave device which is obtained by the second stage synchronization process.

10. A time synchronization method in a communication system including: a passive optical network (PON) having an optical line terminal (OLT), an optical fiber, an optical splitter, and a plurality of optical network units (ONUs); a master device that serves under a first ONU among the plurality of ONUs, and transmits standard time information; and a slave device that serves under a second ONU among the plurality of ONUs, and receives the time information, the communication system comprising:

a first stage process in which the master device transmits a first time synchronization message having a clock timer value of the master device inserted as a time stamp value to the first ONU, and the first ONU transmits a first time synchronization message in which the time stamp value is rewritten to a value obtained by adding a given first retention time within the first ONU to the time stamp value in the first time synchronization message toward the slave device connected to the second ONU;

a second stage process in which the slave device transmits a delay time measurement signal, the second ONU transmits the delay time measurement signal after a given second retention time within the second ONU, the master device receives the delay time measurement signal, and returns a return signal having the clock timer value of the master device inserted as the time stamp value, the first ONU transmits the return signal after the first retention time, the slave device obtains a round-trip propagation delay time according to a difference between a transmit time of the delay time measurement signal and a receive time of the received return signal, and further subtracts the first retention time of the first ONU and the second retention time of the second ONU from the round-trip propagation delay time to determine an one-way propagation delay time between the master device and the slave device; and a third stage process in which the master device transmits a second time synchronization message having the clock timer value of the master device inserted as the time stamp value, and the first ONU receives the second time synchronization message, rewrites the time stamp value to a value obtained by adding the first retention time to the time stamp value in the second time synchronization message, and transmits the rewritten time stamp value, and the slave device sets a clock timer value of the slave device to a value obtained by adding the rewritten time stamp value and the one-way propagation delay time between the master device and the slave device which is obtained in the second stage process.

11. The time synchronization method according to claim 6, wherein the master device has a function of synchronizing the clock timer value of the master device with a time from a GPS satellite or another standard time generator.

12. The time synchronization method according to claim 8, wherein the master device has a function of synchronizing the clock timer value of the master device with a time from a GPS satellite or another standard time generator.

13. The time synchronization method according to claim 9, wherein the master device has a function of synchronizing the clock timer value of the master device with a time from a GPS satellite or another standard time generator.

14. The time synchronization method according to claim 10, wherein the master device has a function of synchronizing the clock timer value of the master device with a time from a GPS satellite or another standard time generator.

* * * * *